US010755162B2

(12) United States Patent
Han et al.

(10) Patent No.: US 10,755,162 B2
(45) Date of Patent: Aug. 25, 2020

(54) METHOD AND APPARATUS TO REDUCE NEURAL NETWORK

(71) Applicant: Samsung Electronics Co., Ltd., Suwon-si (KR)

(72) Inventors: Seung Ju Han, Seoul (KR); Jung Bae Kim, Seoul (KR); Jae Joon Han, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 15/584,611

(22) Filed: May 2, 2017

(65) Prior Publication Data

US 2018/0114110 A1    Apr. 26, 2018

(30) Foreign Application Priority Data

Oct. 26, 2016 (KR) .................. 10-2016-0140215

(51) Int. Cl.
*G06N 3/04* (2006.01)
*G06N 3/08* (2006.01)
*G06N 3/063* (2006.01)

(52) U.S. Cl.
CPC ............ *G06N 3/04* (2013.01); *G06N 3/0454* (2013.01); *G06N 3/063* (2013.01); *G06N 3/08* (2013.01); *G06N 3/082* (2013.01); *G06N 3/084* (2013.01)

(58) Field of Classification Search
None
See application file for complete search history.

(56) References Cited

U.S. PATENT DOCUMENTS

| 5,636,326 | A  | * | 6/1997 | Stork .................. G01N 33/005 706/25 |
| 2009/0204558 | A1 |  | 8/2009 | Weston et al. |
| 2013/0138589 | A1 |  | 5/2013 | Yu et al. |
| 2014/0019388 | A1 |  | 1/2014 | Kingsbury et al. |
| 2014/0372112 | A1 |  | 12/2014 | Xue et al. |
| 2015/0347820 | A1 |  | 12/2015 | Yin et al. |
| 2015/0363688 | A1 |  | 12/2015 | Gao et al. |
| 2016/0171346 | A1 |  | 6/2016 | Han et al. |
| 2017/0262737 | A1 | * | 9/2017 | Rabinovich .......... G06K 9/4628 |
| 2018/0356771 | A1 | * | 12/2018 | Basu .................... A61F 2/72 |
| 2019/0188567 | A1 | * | 6/2019 | Yao ..................... G06N 3/04 |
| 2019/0205740 | A1 | * | 7/2019 | Judd .................... G06N 3/063 |
| 2019/0258917 | A1 | * | 8/2019 | Chai .................... G06K 9/527 |

OTHER PUBLICATIONS

Hu et al., Network Trimming: A Data-Driven Neuron Pruning Approach towards Efficient Deep Architectures, arXiv:1607.03250v1, Jul. 12, 2016, Total pp. 9 (Year: 2016).*

* cited by examiner

*Primary Examiner* — Alan Chen
(74) *Attorney, Agent, or Firm* — NSIP Law

(57) ABSTRACT

A method to reduce a neural network includes: adding a reduced layer, which is reduced from a layer in the neural network, to the neural network; computing a layer loss and a result loss with respect to the reduced layer based on the layer and the reduced layer; and determining a parameter of the reduced layer based on the layer loss and the result loss.

23 Claims, 11 Drawing Sheets

METHOD AND APPARATUS TO REDUCE NEURAL NETWORK

CROSS-REFERENCE TO RELATED APPLICATIONS

This application claims the benefit under 35 USC § 119(a) of Korean Patent Application No. 10-2016-0140215 filed on Oct. 26, 2016, in the Korean Intellectual Property Office, the entire disclosure of which is incorporated herein by reference for all purposes.

BACKGROUND

1. Field

The following description relates to technology that reduces a neural network.

2. Description of Related Art

Research has been actively conducted on applications of an efficient pattern recognition method of a human to a computer to classify a human input pattern. One area of such research is focused on an artificial neural network that models characteristics of biological nerve cells of a human through mathematical expressions. To classify the input pattern, the artificial neural network employs an algorithm that simulates a learning capability of a human. Through this algorithm, the artificial neural network generates mapping between the input pattern and output patterns. The capability of generating such a mapping is referred to as a learning capability of the artificial neural network. Based on a result of the learning, the artificial neural network generates an output with respect to an input pattern yet to be used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method to reduce a neural network includes: adding a first reduced layer, which is reduced from a first layer in the neural network, to the neural network; computing a first layer loss and a first result loss with respect to the first reduced layer based on the first layer and the first reduced layer; and determining a parameter of the first reduced layer based on the first layer loss and the first result loss.

The determining of the parameter of the first reduced layer may include: computing a network loss based on the first layer loss and the first result loss; and determining the parameter of the first reduced layer to reduce the network loss.

The method may further include: removing the first layer from the neural network, in response to the network loss being less than a threshold loss.

The computing of the network loss may include: determining a layer weight to be applied to the first layer loss to be a value greater than a result weight to be applied to the first result loss, in response to the network loss being greater than or equal to an initial loss; and computing the network loss based on the layer weight, the first layer loss, the result weight, and the first result loss.

The method may further include: determining a layer weight to be applied to the first layer loss to be a value greater than a result weight to be applied to the first result loss, in response to the network loss being less than an initial loss; and computing the network loss based on the first layer weight, the first layer loss, the first result weight, and the first result loss.

The computing of the first layer loss and the first result loss may include: computing the first layer loss based on an output of the first layer and an output of the first reduced layer; and computing the first result loss based on the output of the first reduced layer and a training output of training data.

The computing of the first layer loss may include computing a similarity between the output of the first layer and the output of the first reduced layer. The computing of the first result loss may include computing a similarity between the output of the first reduced layer and the training output.

The method may further include: maintaining the parameter of the first reduced layer, in response to a network loss being less than a threshold loss; adding a second reduced layer, which is reduced from a second layer in the neural network, to the neural network; re-computing a result loss based on the first reduced layer; computing a second layer loss and a second result loss based on the second layer and the second reduced layer; and determining a parameter of the second reduced layer based on the re-computed result loss, the second layer loss, and the second result loss.

The adding of the first reduced layer may include: generating reduced layers corresponding to layers in the neural network, respectively; and connecting each of the reduced layers to a layer among the layers in the neural network based on a connection order of the layers in the neural network.

The computing of the first layer loss and the first result loss may include: computing layer losses for a same epoch based on an output of each of the layers in the neural network and an output of each of the reduced layers; and computing result losses based on the output of each of the reduced layers and a training output of training data.

The determining of the parameter of the first reduced layer may include: computing a network loss based on a weighted sum of the layer losses and a weighted sum of the result losses; and determining parameters of reduced layers to reduce the network loss.

The adding of the first reduced layer may include: generating the first reduced layer by reducing a number of parameters of the first layer; and connecting the first reduced layer to another layer in the neural network.

The adding of the first reduced layer may include reducing layers in the neural network to a single layer.

The adding of the first reduced layer may include reducing a layer connected adjacent to an input layer in the neural network.

The adding of the first reduced layer may include reducing a layer connected adjacent to an output layer in the neural network.

The method may further include repeating the determining of the parameter of the neural network and computation of a network loss computed based on the first layer loss and the first result loss until the network loss is less than a threshold loss.

The method may further include determining parameters of nodes in the neural network using gradient descent based on a loss to be back-propagated to the neural network and output values of the nodes.

The method may further include obtaining the neural network comprising layers each including nodes, and connection weights to connect the nodes included in each of the layers to a node included in another layer among the layers.

A non-transitory computer-readable medium may store instructions that, when executed by a processor, cause the processor to perform the method of claim 1.

In another general aspect, an apparatus to reduce a neural network includes: a memory storing an instruction; and a processor configured to execute the instruction to add a reduced layer, which is reduced from a layer in the neural network, to the neural network, compute a layer loss and a result loss with respect to the reduced layer based on the layer in the neural network and the reduced layer, and determine a parameter of the reduced layer based on the layer loss and the result loss.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
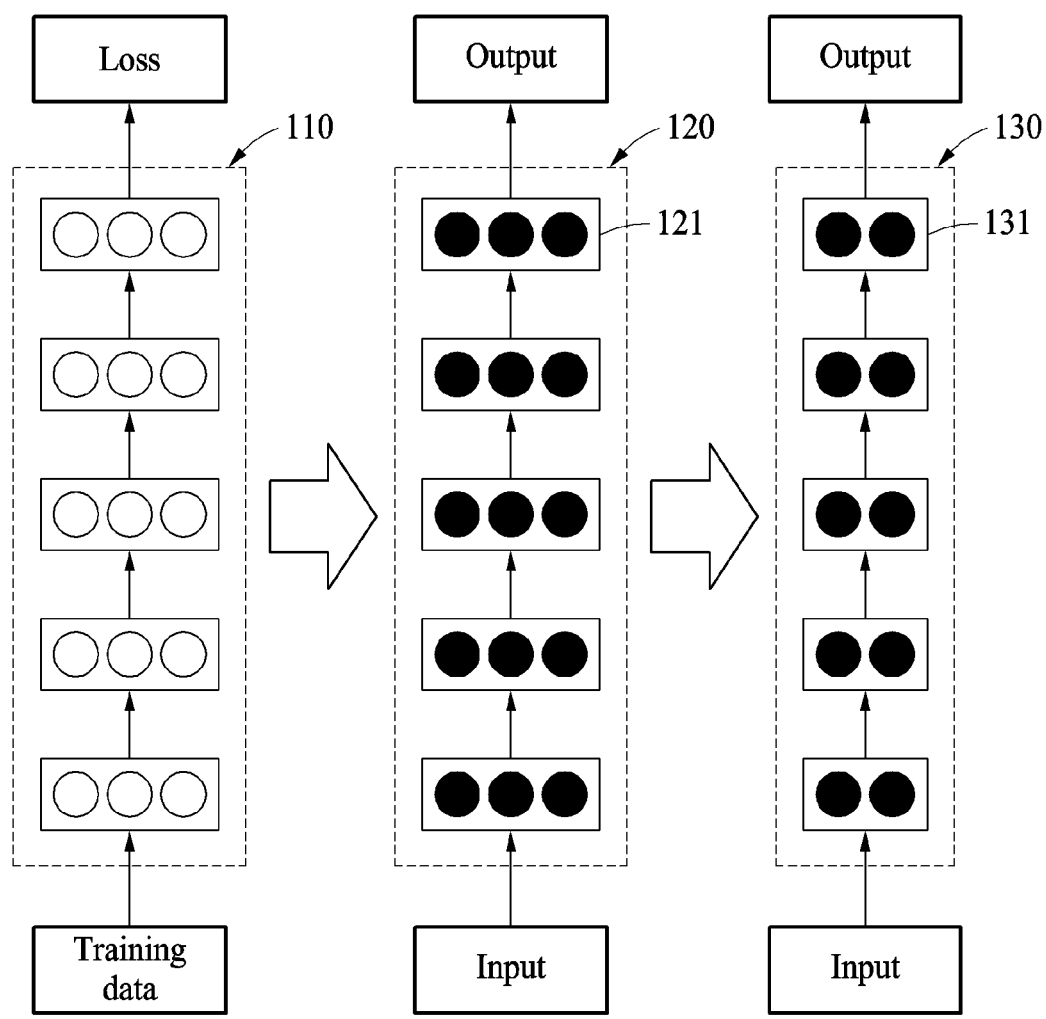
FIG. 1 is a diagram illustrating reducing of a neural network, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When a detailed description related to a known function or configuration may make description of the examples unnecessarily ambiguous, the detailed description will be omitted.

FIG. 1 is a diagram illustrating reducing of a neural network, according to an embodiment.

Referring to FIG. 1, a training apparatus trains a neural network 110 based on training data to recognize abstract information, for example, an identity, a face, a voice, a speech, or a conversation of a human, from a predetermined input, for example, image data or sound data. The training apparatus trains a parameter of a layer included in the neural network 110 to minimize a loss to be computed using a loss function, for example, a cross entropy function, based on the training data.

The neural network 110 includes layers, and each of the layers includes nodes. A node is also referred to as a neuron. Neurons of neighboring layers are connected through edges. An edge is also referred to as a synapse. Connection weights are assigned to the edges through training, and parameters corresponding to layers include the connection weights. A processor computes an output of a layer from an input with respect to the layer based on a connection weight of the layer and an activation function. The neural network 110 will be described further with reference to FIG. 10.

The training data includes a pair of a training inputs and a training outputs. For example, the training data is, when a predetermined training input is provided, data to which a training output corresponding thereto is mapped.

Still referring to FIG. 1, a recognition apparatus generates an output from an input using a trained neural network 120 to recognize the abstract information. The output is a recognition result obtained from the input based on the trained neural network 120.

When the neural network 120 is a deep neural network (DNN), the neural network 120 includes a relatively deep layer to improve a recognition rate of the neural network 120. As the neural network 120 includes a deeper layer, a memory size occupied by a structure of the neural network 120 increases. As the memory size increases, it becomes more difficult to apply the neural network 120 to a mobile device. Thus, there is a need for a neural network structure that reduces a memory size while maintaining a satisfactory recognition rate.

Referring to FIG. 12, to improve the memory size and the recognition rate of the neural network 120, a neural network reducing apparatus reduces a number of parameters of each layer included in the trained neural network 120 and a number of parameters of a layer set including layers among the layers of the trained neural network 120.

As shown in FIG. 1, the neural network reducing apparatus generates a reduced neural network 130 by generating and training a layer 131 reduced from a portion of layers, for example, a layer 121, of the trained neural network 120.

Figure 2:
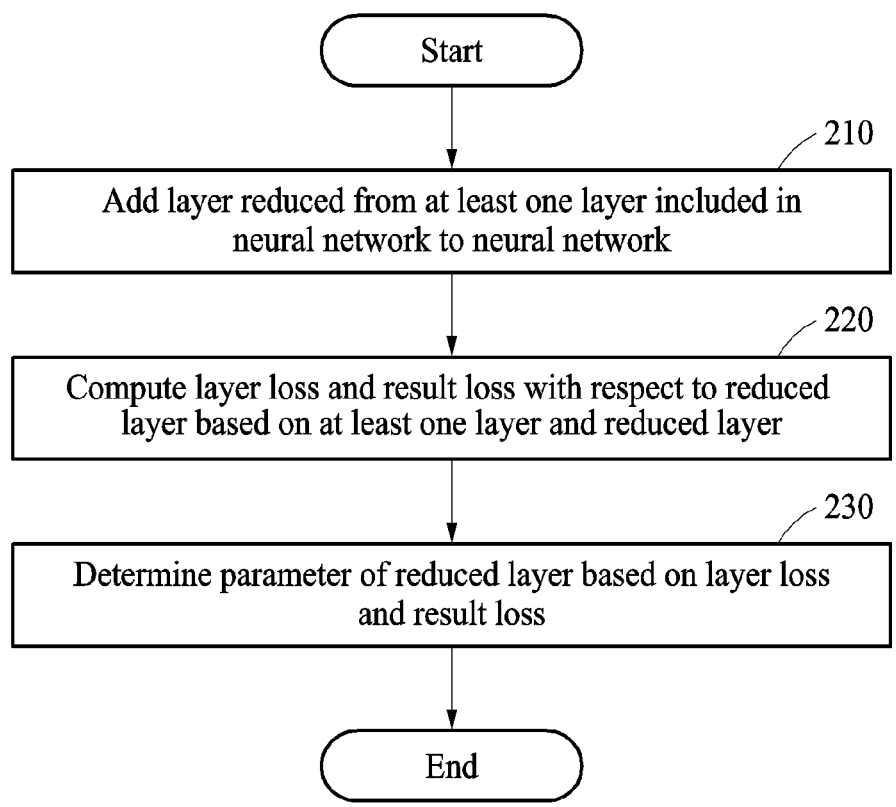
FIGS. 2 and 3 are flowcharts illustrating a method of reducing a neural network, according to an embodiment.
Figure 3:
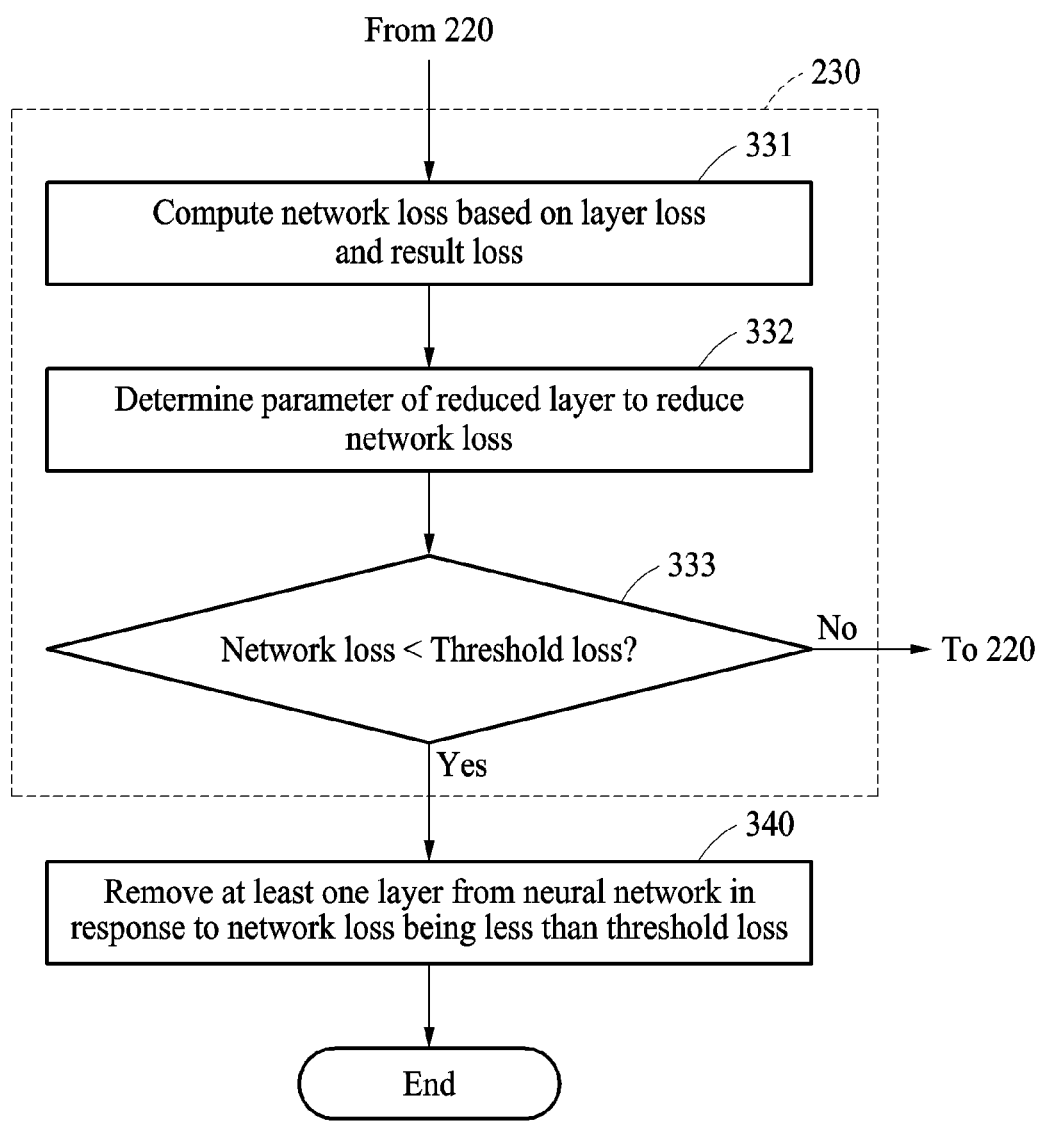

FIGS. 2 and 3 are flowcharts illustrating a method of reducing a neural network, according to an embodiment.

Referring to FIG. 2, in operation 210, a neural network reducing apparatus adds a reduced layer, which is reduced from at least one layer in a neural network, to the neural network. The neural network reducing apparatus generates the reduced layer by reducing a number of parameters of the at least one layer. For example, the neural network reducing apparatus reduces a number of connection weights of the at least one layer based on a singular value decomposition (SVD) scheme and a canonical polyadic decomposition (CPD) scheme. The neural network reducing apparatus may reduce a number of parameters with respect to not only a single layer of the neural network, but also multiple layers of the neural network.

Figure 5:
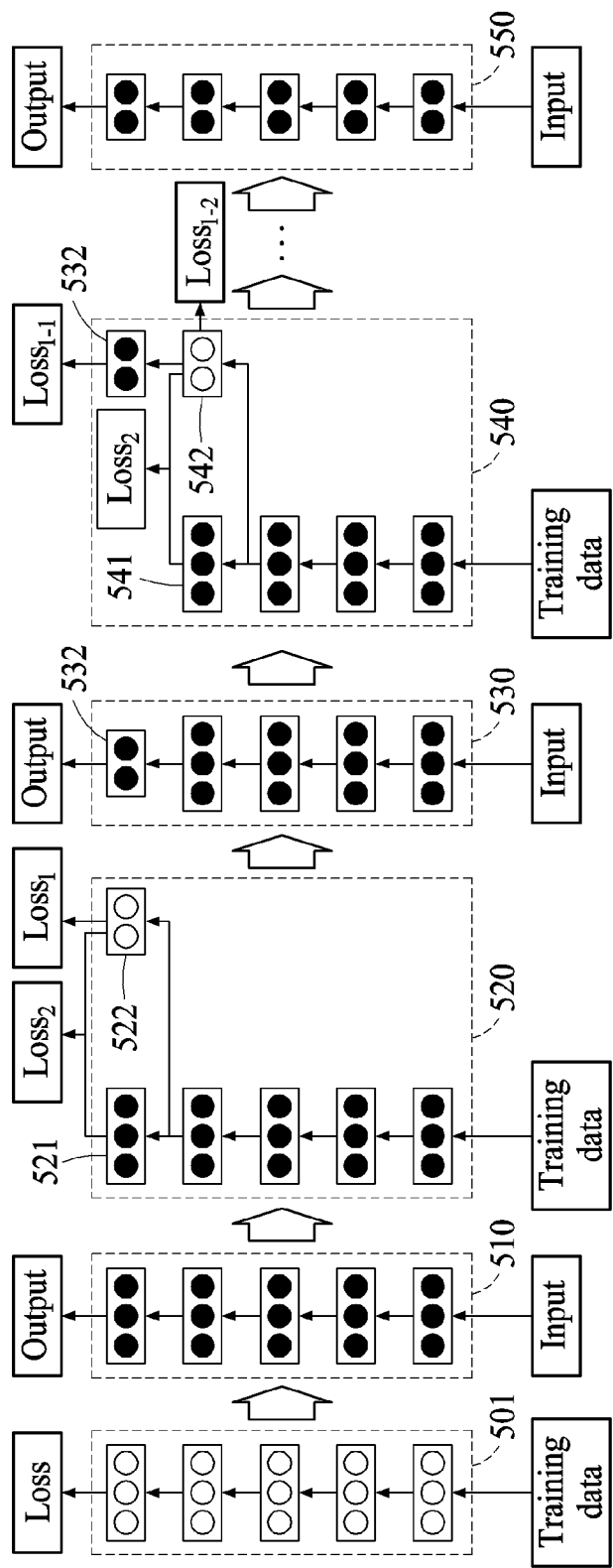
Figure 7:
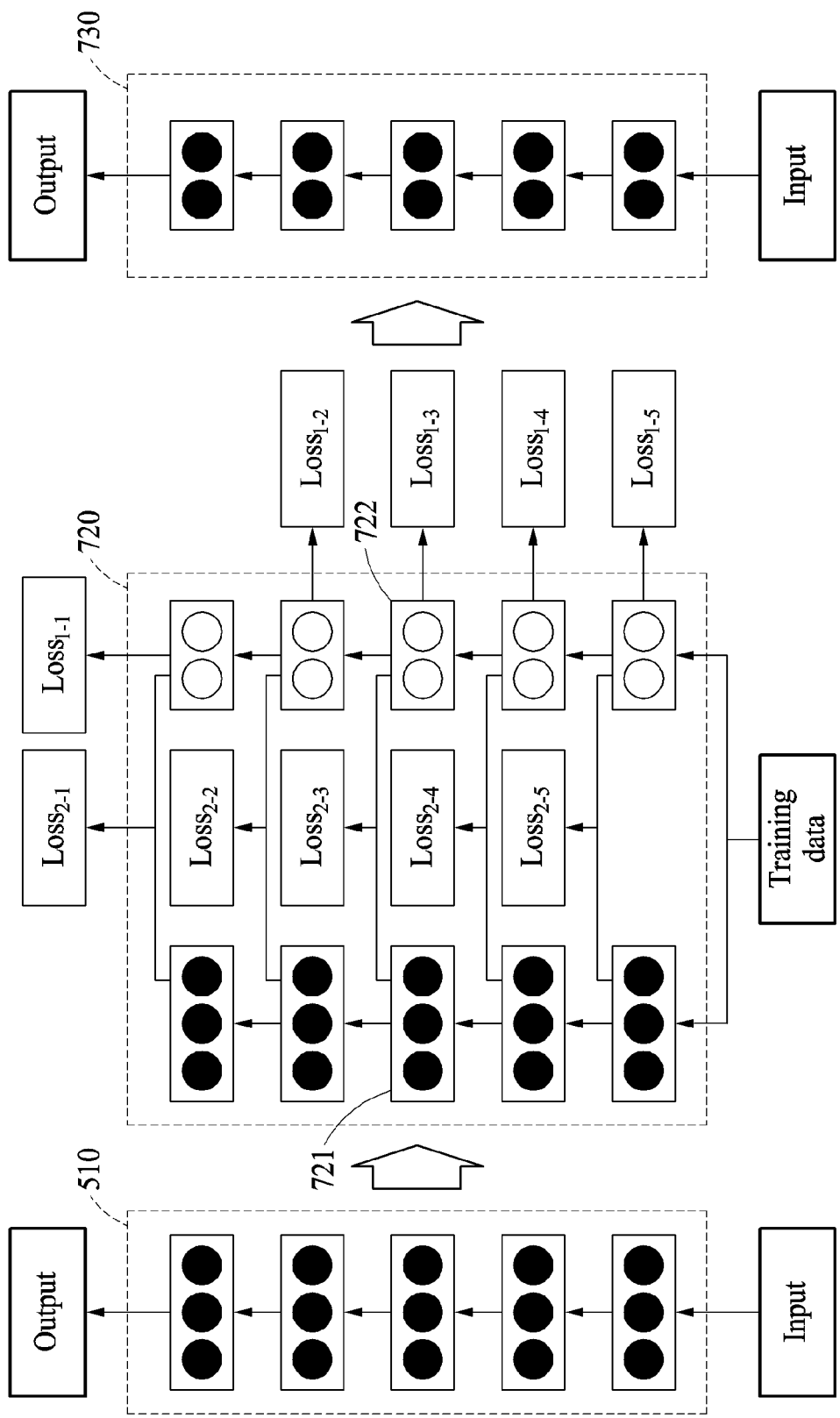

The neural network reducing apparatus connects the reduced layer to another layer of the neural network. For example, as shown in FIG. 5, the neural network reducing apparatus connects the reduced layer to a previous layer of an existing layer corresponding to the reduced layer. However, embodiments are not limited to the foregoing example. The neural network reducing apparatus also connects the reduced layer to a previous layer of the reduced layer, as shown in FIG. 7. For example, the neural network reducing apparatus connects an output of the previous layer to an input of the reduced layer.

As shown in FIG. 2, in operation 220, the neural network reducing apparatus computes a layer loss and a result loss with respect to the reduced layer based on the at least one layer and the reduced layer. The neural network reducing apparatus computes the layer loss based on an output of the at least one layer and an output of the reduced layer. The neural network reducing apparatus computes the result loss based on the output of the reduced layer and a training output of training data.

Hereinafter, the layer loss is a loss computed based on respective outputs of two layers. The result loss is a loss computed based on an output of one layer and a training output.

For example, the neural network reducing apparatus computes a similarity between the output of the at least one layer and the output of the reduced layer as the layer loss. The layer loss is computed based on a Euclidean distance. For example, an L1-norm or L2-norm is used as a loss function.

Further, the neural network reducing apparatus computes a similarity between the output of the reduced layer and the training output as the result loss. The result loss is computed using a function that represents a similarity between entropies indicated by the respective outputs, and for example, a cross entropy function is used as the loss function.

In operation 230, the neural network reducing apparatus determines a parameter of the reduced layer based on the layer loss and the result loss.

In detail, as shown in FIG. 3, in operation 331, the neural network reducing apparatus computes a network loss based on the layer loss and the result loss. The network loss is computed based on the layer loss to which a layer weight is applied and the result loss to which a result weight is applied, and corresponds to, for example, a sum of values obtained by applying weights to the respective losses.

In operation 332, the neural network reducing apparatus determines the parameter of the reduced layer to reduce the network loss.

In operation 333, the neural network reducing apparatus determines whether the network loss is less than a threshold loss. The threshold loss is a loss value set such that a recognition rate of the neural network is to be greater than or equal to a threshold accuracy. In response to the network loss of the neural network being less than the threshold loss, the recognition rate of the neural network is greater than or equal to the threshold accuracy.

The neural network reducing apparatus repeats determination of a parameter of the neural network and computation of the network loss until the network loss computed based on the layer loss and the result loss is less than the threshold loss. For example, the neural network reducing apparatus repeats operations 220, 331, and 332 until the network loss is less than the threshold loss.

The neural network reducing apparatus performs training through two steps. That is, the neural network reducing apparatus determines the parameter of the neural network to mainly reduce the layer loss at an early stage, and then determines the parameter of the neural network to mainly reduce the result loss.

For example, in response to the network loss being greater than or equal to an initial loss, the neural network reducing apparatus determines the layer weight to be applied to the layer loss to be a value greater than the result weight to be applied to the result loss. The neural network reducing apparatus computes the network loss based on the layer weight, the layer loss, the result weight, and the result loss. In response to the network loss being greater than or equal to the initial loss, current training is classified as being initial training, and the neural network reducing apparatus computes the network loss by setting the layer weight to be applied to the layer loss to be a much greater value.

The neural network reducing apparatus determines the layer weight to be applied to the layer loss to be a value greater than the result weight to be applied to the result loss in response to the network loss being less than the initial loss. The neural network reducing apparatus computes the network loss based on the layer weight, the layer loss, the result weight, and the result loss. In response to the network loss being less than the initial loss, the current training is classified as having passed a time of the initial training, and the neural network reducing apparatus computes the network loss by setting the result weight to be applied to the result loss to be a much greater value.

In operation 340, the neural network reducing apparatus removes the at least one layer from the neural network, in response to the network loss being less than the threshold loss. For example, in response to the network loss being less than the threshold loss, the neural network reducing apparatus determines that training with respect to the reduced layer is terminated. The neural network reducing apparatus generates a reduced neural network by removing the at least one layer corresponding to the reduced layer. Thus, the neural network reducing apparatus reduces the neural network by replacing the at least one layer with the reduced layer.

The neural network reducing apparatus may reduce a memory size occupied by a neural network having a deeper structure to improve a recognition rate, and the reduced neural network may be applied to a mobile device. Further, the reduction may improve a recognition speed and an authentication speed using the neural network.

Figure 4:
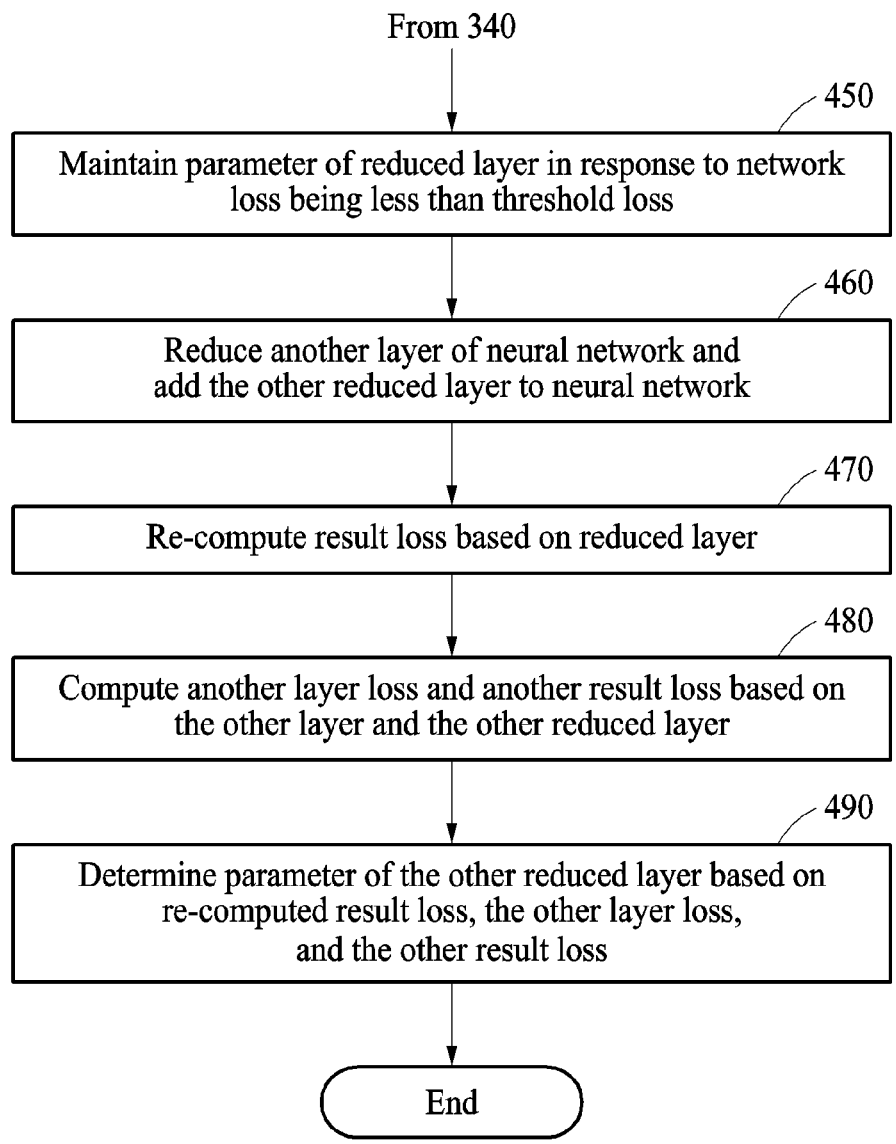
FIGS. 4 and 5 illustrate a process of sequentially reducing a neural network, according to an embodiment.

FIGS. 4 and 5 illustrate an example of a process of sequentially reducing a neural network, according to an embodiment.

A neural network of FIG. 5 includes five layers. In another example, the neural network may include five layer modules each including layers. A layer module is a set of layers. However, a number of layers or a number of layer modules is not limited to "5", and may be "n", n being an integer greater than or equal to "1". Hereinafter, a process of reducing a number of parameters corresponding to layers or layer modules while maintaining a recognition rate of a neural network 510 will be described.

An initially generated neural network 501 is in a state in which parameters corresponding to layers are initialized. For example, a training apparatus trains the neural network 501 based on training data to provide a neural network 510 trained by the training apparatus. The neural network 510 trained by the training apparatus is used by a recognition apparatus to generate an output from an input.

A neural network reducing apparatus generates a reduced layer 522, which is reduced from at least one layer 521, and adds the reduced layer 522 to a neural network 520, in operation 210 of FIG. 2. The neural network reducing apparatus connects the reduced layer 522 to a previous layer of the at least one layer 521. The neural network reducing apparatus computes a layer loss $Loss_2$ and a result loss $Loss_1$ based on the at least one layer 521 and the reduced layer 522, in operation 220 of FIG. 2. The neural network reducing apparatus bypasses an output of the previous layer of the at least one layer 521 to the reduced layer 522, and computes an output of the reduced layer 522 using the bypassed output as an input of the reduced layer 522.

The neural network reducing apparatus uses an L-norm, for example, an L1 or L2 distance, of an output of the at least one layer 521 and an output of the reduced layer 522 as a loss function. By comparing the outputs of the two layers, the neural network reducing apparatus quickly reflects a characteristic of at least one trained layer in a reduced layer to be trained. Further, the neural network reducing apparatus uses a cross entropy function with respect to the output of the reduced layer and a training output as the loss function. A network loss of the neural network 520 of FIG. 5 is expressed as given by Equation 1.

$$Loss = \lambda 1 \cdot Loss_1 + \lambda 2 \cdot Loss_2 \quad \text{[Equation 1]}$$

In Equation 1, $\lambda 1$ is a result weight to be applied to a result loss, and $\lambda 2$ is a layer weight to be applied to a layer loss. For example, $Loss_1$ is a cross entropy function, and $Loss_2$ is an L2-norm. The neural network reducing apparatus adjusts the result weight and the layer weight to satisfy $\lambda 1 \ll \lambda 2$ in early training. For example, in the early training, the neural network reducing apparatus trains the reduced layer 522 to maximize a similarity between the at least one layer 521 and the reduced layer 522.

In response to a parameter corresponding to the reduced layer being trained at a level greater than or equal to a predetermined level, for example, in response to the network loss being less than an initial loss, the neural network reducing apparatus adjusts the result weight and the layer weight to satisfy $\lambda 1 \gg \lambda 2$. After the initial training is past, the neural network reducing apparatus trains the reduced layer 522 to increase a recognition rate of the reduced layer 522.

The neural network reducing apparatus trains the neural network 520 based on the layer loss $Loss_2$ and the result loss $Loss_1$. In response to the network loss being less than the threshold loss, the neural network reducing apparatus generates a neural network 530 including a reduced layer 532, which is reduced from the at least one layer 521. The neural network reducing apparatus removes the at least one layer 521.

Referring to FIG. 4, in operation 450, in response to the network loss being less than the threshold loss, the neural network reducing apparatus maintains a parameter of the reduced layer 532. The neural network reducing apparatus fixes the parameter of the reduced layer 532 while reducing and training another layer 541 in operations 470 through 490.

In operation 460, the neural network reducing apparatus reduces the other layer 541 of a neural network 540 to form another reduced layer 542, and adds the other reduced layer 542 to the neural network 540. For example, the neural network reducing apparatus selects a previous layer of the reduced layer 532 trained in operation 340 as the other layer 541 to be reduced. The neural network reducing apparatus connects the other reduced layer 542 to a previous layer of the other layer 541 of the neural network 540.

In operation 470, the neural network reducing apparatus re-computes a result loss $Loss_{1-1}$ based on the reduced layer. For example, the neural network reducing apparatus computes the result loss $Loss_{1-1}$ between the output of the reduced layer 532 of the neural network 540 and a training output of training data.

In operation 480, the neural network reducing apparatus computes another layer loss $Loss_2$ and another result loss $Loss_{1-2}$ based on the other layer 541 and the other reduced layer 542. For example, the neural network reducing apparatus computes the other layer loss $Loss_2$ based on an output of the other layer 541 and an output of the other reduced layer 542, and computes the other result loss $Loss_{1-2}$ based on the output of the other reduced layer 542 and the training output.

In operation 490, the neural network reducing apparatus determines a parameter of the other reduced layer 542 based on the re-computed result loss $Loss_{1-1}$, the other layer loss $Loss_2$, and the other result loss $Loss_{1-2}$.

The neural network reducing apparatus repeats operations 450 through 490 to reduce parameters corresponding to the respective layers included in the neural network in an order from a layer adjacent to an output layer of the neural network to a layer adjacent to an input layer of the neural network, thereby generating a neural network 550 in which all layers are reduced. The neural network 550 in which all layers are reduced is provided in the recognition apparatus. The neural network 550 has a recognition rate similar to that of the neural network 510 yet to be reduced, requires a reduced memory size, and provides an increased recognition speed.

The neural network 530 requires a relatively small memory size and provides a relatively fast recognition speed, when compared to the neural network 510. Further, the neural network 550 requires a smaller memory size and provides a faster recognition speed than the neural network 530. Finally, the reduced neural network 550 requires a smaller memory size than the neural network 510 and has a recognition rate similar or equal to that of the neural network 510.

Figure 6:
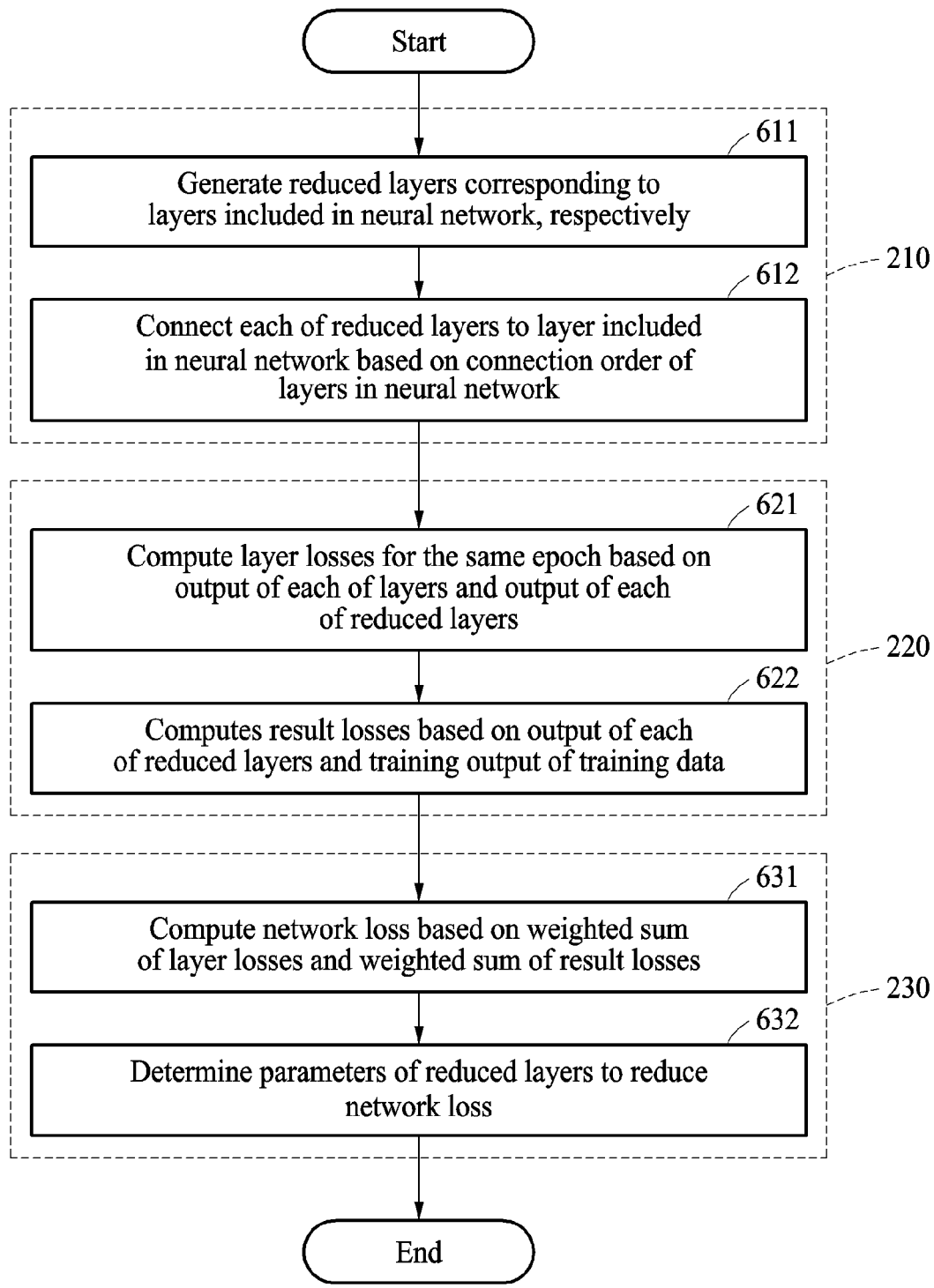
FIGS. 6 and 7 illustrate a process of collectively reducing a neural network, according to an embodiment.

FIGS. 6 and 7 illustrate a process of collectively reducing a neural network, according to an embodiment.

Referring to FIG. 6, in operation 611, a neural network reducing apparatus generates reduced layers corresponding to respective layers included in the neural network 510. The neural network reducing apparatus generates the reduced layers with respect to all layers included in the trained neural network 510. As shown in FIG. 7, for example, the neural network reducing apparatus generates a reduced layer 722 with respect to a layer 721 of the neural network 510. For example, the neural network reducing apparatus generates a reduced layer corresponding to each layer of the neural network 510 by applying a scheme of reducing a dimension of a matrix representing a parameter, such as SVD or CPD, to each layer.

In operation 612, the neural network reducing apparatus connects each of the reduced layers to a respective layer in the neural network 510 based on a connection order of the layers in the neural network 510. The connection order is an order in which layers are connected from an input layer to an output layer. The neural network reducing apparatus connects the reduced layers based on the connection order from the input layer to the output layer of the trained neural network 510, thereby generating a neural network 720 including the reduced layers.

In operation 621, the neural network reducing apparatus computes layer losses for the same epoch based on an output of each of the layers and an output of each of the reduced layers. For example, the neural network reducing apparatus computes a layer loss $Loss_{2-3}$ between an output of the layer 721 and an output of the reduced layer 722 corresponding to the layer 721 in the neural network 720. In FIG. 5, five layers and five reduced layers being connected based on a connection order are illustrated, and the neural network reducing apparatus computes layer losses $Loss_{2-1}$, $Loss_{2-2}$, $Loss_{2-3}$, $Loss_{2-4}$, and $Loss_{2-5}$ with respect to each layer and a reduced layer corresponding to the layer. However, a number of layers and a number of reduced layers are not limited to those illustrated in FIG. 5. A depth of the neural network may vary according to a design.

An epoch is a unit of neural network training. A single epoch indicates that a neural network is trained one time using the entire provided reference data. In an example, the neural network reducing apparatus computes layer losses based on an output of each layer and an output of each reduced layer during the same epoch, thereby training reduced layers for the same epoch.

In operation 622, the neural network reducing apparatus computes result losses $Loss_{1-1}$, $Loss_{1-2}$, $Loss_{1-3}$, $Loss_{1-4}$, and $Loss_{1-5}$ based on the output of each of the reduced layers and a training output of training data.

In operation 631, the neural network reducing apparatus computes a network loss based on a weighted sum of the layer losses and a weighted sum of the result losses. The neural network reducing apparatus computes the network loss $Loss_{total}$ using Equation 2.

$$Loss_{total} = \Sigma \lambda_{1-i} \cdot Loss_{1-i} + \Sigma \lambda_{2-j} \cdot Loss_{2-j} \quad \text{[Equation 2]}$$

In Equation 2, $\lambda_{1-i}$ is an i-th result weight with respect to a result loss $Loss_{1-i}$ between an output of an i-th reduced layer and a training output. $\lambda_{2-j}$ is a j-th layer weight with respect to an i-th layer loss $Loss_{2-j}$ between an output of an i-th layer and an output of an i-th reduced layer. Here, i and j are integers greater than or equal to "1". For example, the result loss $Loss_{1-i}$ is a cross entropy function, and the layer loss $Loss_{2-j}$ is an L2-norm.

In operation 632, the neural network reducing apparatus determines parameters of the reduced layers to reduce the network loss. In the early training, the neural network reducing apparatus adjusts the result weight and the layer weight to satisfy $\lambda_{1-i} \gg \lambda_{2-j}$. As described above, in the early training, the neural network reducing apparatus mainly considers the layer loss. The neural network reducing apparatus determines a parameter of the reduced layer such that the same output is computed in response to the same input being provided with respect to a layer and a reduced layer.

In response to the network loss being less than the initial loss, the neural network reducing apparatus adjusts the result weight and the layer weight to satisfy $\lambda_{1-i} \gg \lambda_{2-j}$. After the initial training is past, the neural network reducing apparatus mainly considers the result loss, and determines the parameter of the reduced layer to minimize a loss between the output of the reduced layer and the training output.

A reduced neural network 730 has a recognition rate similar to that of the trained neural network 510, and requires a relatively small memory size.

Figure 8:
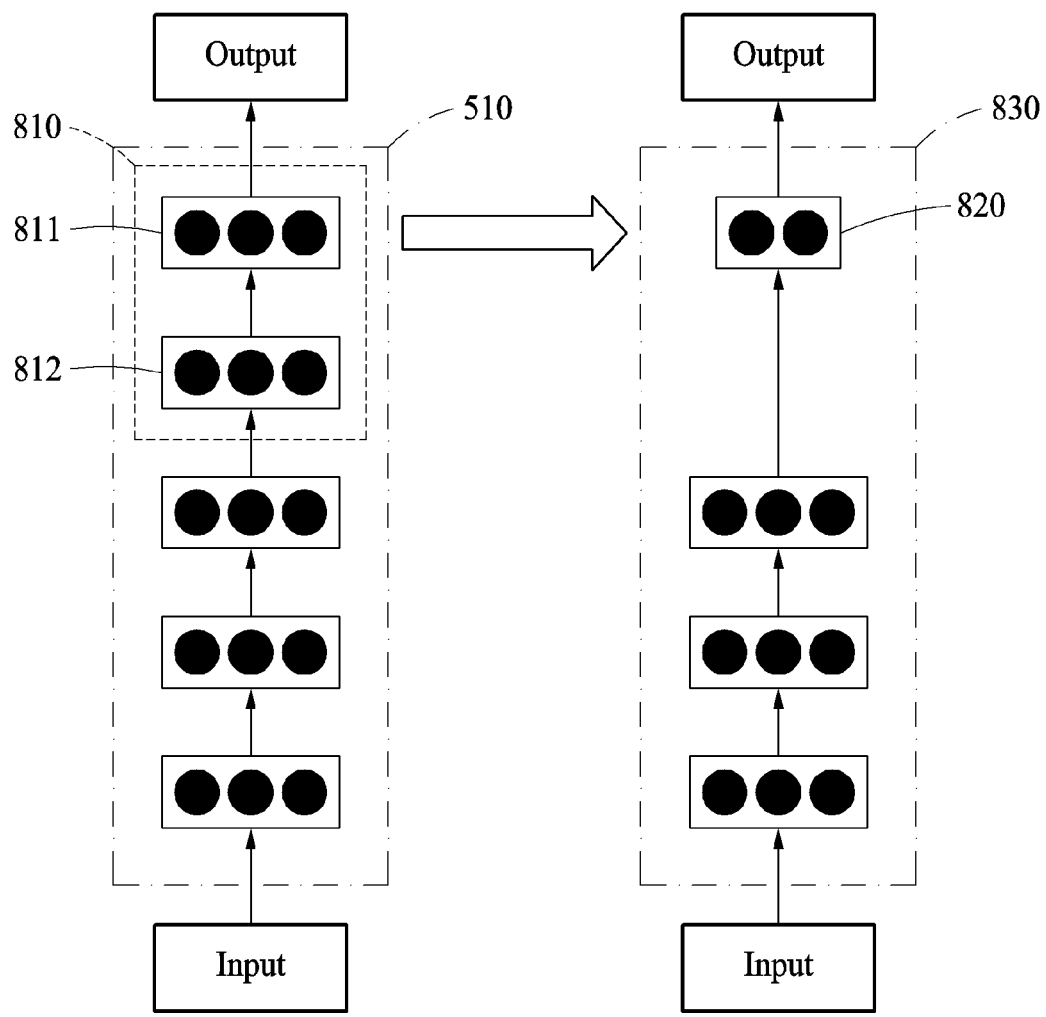
FIG. 8 is a diagram illustrating reducing of a layer of a neural network, according to another embodiment.

FIG. 8 is a diagram illustrating reducing of a layer of a neural network, according to an embodiment.

Referring to FIG. 8, a neural network reducing apparatus reduces layers 811 and 812 in the neural network 510 to a single layer 820. For example, the neural network reducing apparatus generates the layer 820 reduced from a layer module 810 including the layers 811 and 812 in the neural network 510. The neural network reducing apparatus generates the single layer 820 by reducing a number of parameters corresponding to the layers 811 and 812. When the reduced layer 820 is trained, the neural network reducing apparatus includes the reduced single layer 820, and generates a neural network 830 from which the existing layers 811 and 812 are removed.

FIG. 8 illustrates the layer module 810 including two layers 811 and 812. However, embodiments are not limited to this example. A number of layers included in the single layer module 810 may vary according to a design. Further, although a set of the layers 811 and 812 is referred to as the layer module 810, embodiments are not limited to this example. An individual layer may include multiple layers.

Figure 9:
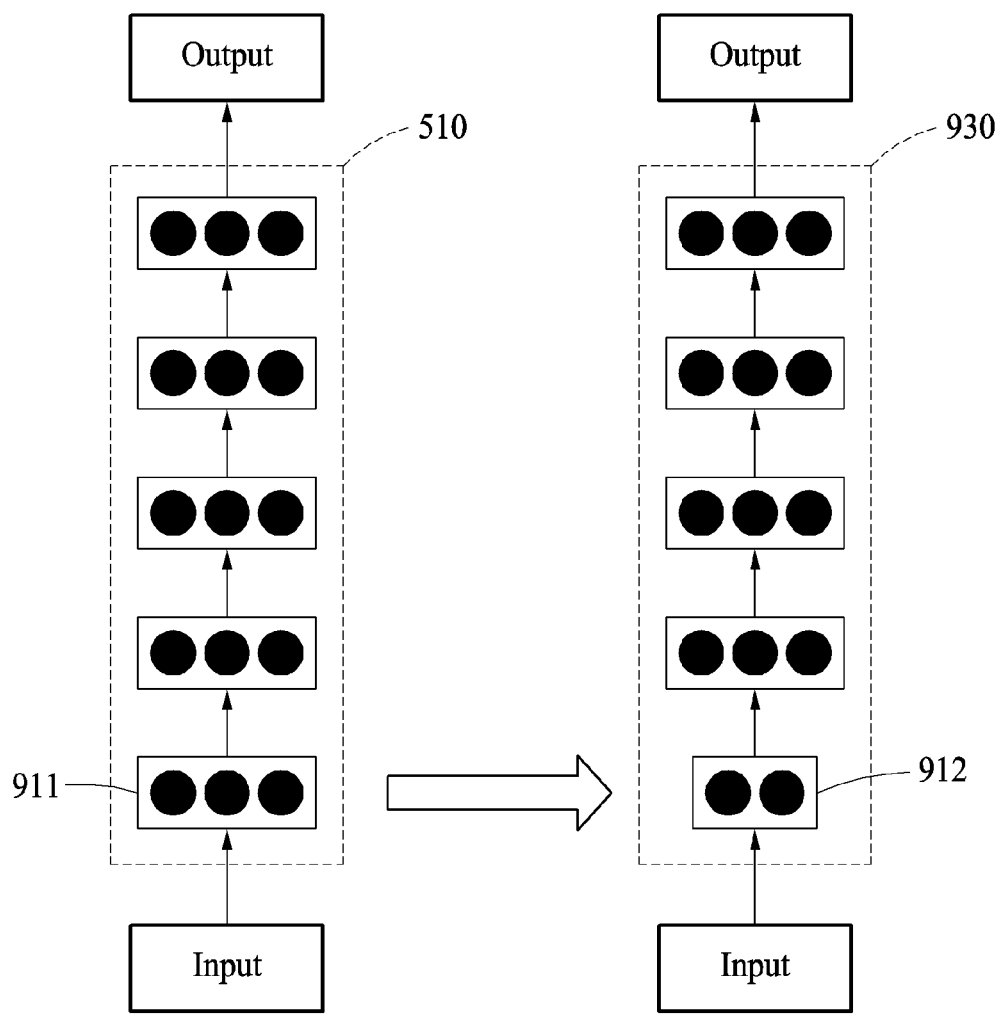
FIG. 9 is a diagram illustrating a layer to be reduced in a neural network, according to an embodiment.

FIG. 9 is a diagram illustrating a layer to be reduced in a neural network, according to an embodiment.

A neural network reducing apparatus reduces a layer connected adjacent to an output layer included in a neural network. For example, in FIGS. 1 through 8, an example in which the neural network reducing apparatus reduces a layer adjacent to an output layer in the neural network 510, or reduces layers included in the neural network 510 in an order from the output layer to an input layer has been described.

When the layer adjacent to the output layer is reduced to have a fewer number of parameters, a memory size occupied by the neural network may decrease.

However, embodiments are not limited to the examples described above. In FIG. 9, a process in which the neural network reducing apparatus reduces a layer adjacent to the input layer in the neural network 510, or reduces layers included in the neural network 510 in an order from the input layer to the output layer will be described.

As shown in FIG. 9, the neural network reducing apparatus reduces a layer 911 connected adjacent to the input layer in the neural network 510. For example, the neural network reducing apparatus reduces the subsequent layer 911 of the input layer, and trains a parameter corresponding to a layer 912 reduced from the subsequent layer 911. When the reduced layer 912 is trained, the neural network reducing apparatus generates a neural network 930 including the layer 912 reduced from the layer 911 adjacent to the input layer.

When the layer 911 adjacent to the input layer is reduced to have a fewer number of parameters, a time to be used for an input decreases.

The neural network reducing apparatus selects either one or both of a layer adjacent to the input layer or a layer adjacent to the output layer and reduces the selected layer, based on a required specification for the neural network.

For example, when the required specification requires a predetermined recognition speed, the neural network reducing apparatus first reduces a layer connected to the input layer, and sequentially reduces layers in a direction from the input layer to the output layer until the recognition speed of the neural network is greater than or equal to a predetermined recognition speed. Further, the neural network reducing apparatus determines a number of layers to be reduced based on the predetermined recognition speed, selects layers corresponding to the determined number, and reduces the selected layers. The neural network reducing apparatus sequentially selects layers to be reduced in the direction from the input layer to the output layer.

In another example, when the required specification requires a predetermined memory size, the neural network reducing apparatus first reduces a layer connected to the output layer, and sequentially reduces layers in a direction from the output layer to the input layer until the memory size of the neural network is less than a predetermined memory size. Further, the neural network reducing apparatus determines a number of layers to be reduced based on the predetermined memory size, selects layers corresponding to the determined number, and reduces the selected layers. The neural network reducing apparatus sequentially selects layers to be reduced in the direction from the output layer to the input layer.

However, selection of layers to be reduced is not limited to the above examples. The neural network reducing apparatus may skip a portion of layers or select a portion of layers at random.

Figure 10:
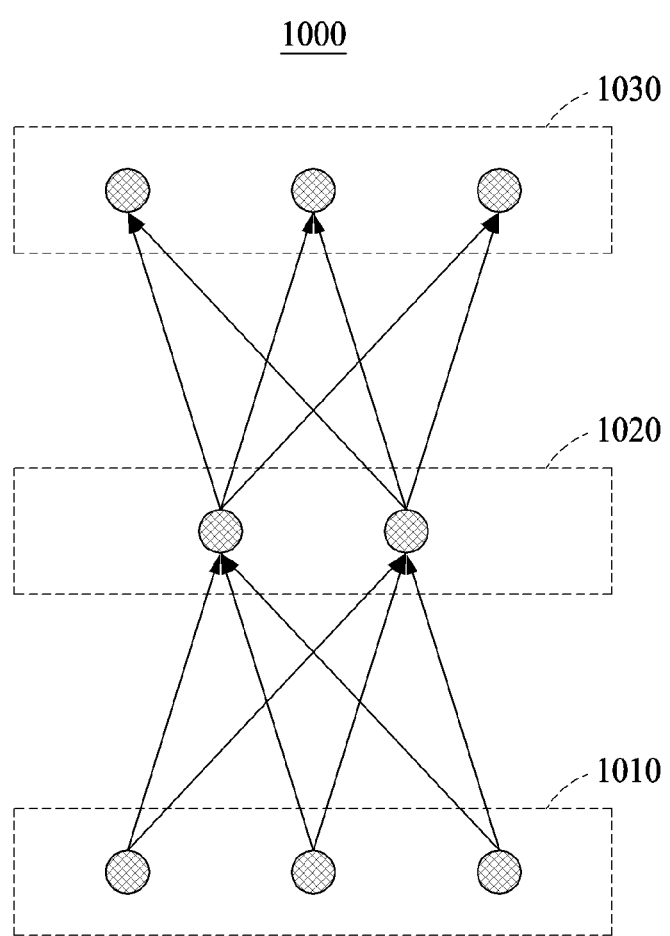
FIG. 10 illustrates a structure of a neural network, according to an embodiment.

FIG. 10 illustrates a structure of a neural network 1000, according to an embodiment.

Referring to FIG. 10, the neural network 1000 includes layers, each including nodes. The neural network 1000 includes connection weights to connect the nodes included in each of the layers to a node included in another layer. A neural network reducing apparatus obtains the neural network 1000 from an internal database stored in a memory, or receives the neural network 1000 from an external server through a communicator.

For example, the neural network 1000 is a recognition model that simulates a computation capability of a biological system using a large number of artificial neurons connected through edges. The neural network 1000 may be implemented as software, hardware, or a combination thereof. The neural network 1000 may also be referred to as an artificial neural network.

The neural network 1000 uses artificial neurons configured by simplifying functions of biological neurons. The artificial neurons may also be referred to as nodes. The artificial neurons are connected to each other through edges having connection weights. The connection weights are predetermined values of the edges, and may also be referred to as synapse weights or connection strengths.

The neural network 1000 includes layers. For example, the neural network 1000 includes an input layer 1010, a hidden layer 1020, and an output layer 1030. The input layer 1010 receives an input to be used to perform training or recognition and transmits the input to the hidden layer 1020. The output layer 1030 generates an output of the neural network 1000 based on signals received from the hidden layer 1020. The hidden layer 1020 is disposed between the input layer 1010 and the output layer 1030, and changes a training input of training data received from the input layer 1010 to an easily predictable value.

The input layer 1010, the hidden layer 1020, and the output layer 1030 each include nodes. The nodes included in the input layer 1010 may be referred to as input nodes, the nodes included in the hidden layer 1020 may be referred to as hidden nodes, and the nodes included in the output layer 1030 may be referred to as output nodes.

The input nodes included in the input layer 1010 and the hidden nodes included in the hidden layer 1020 are connected to each other through edges having connection weights. The hidden nodes included in the hidden layer 1020 and the output nodes included in the output layer 1030 are also connected to each other through edges having connection weights.

Although not shown in the drawings, a neural network may include multiple hidden layers. A neural network including multiple hidden layers may be referred to as a deep neural network. Training a deep neural network may be referred to as deep learning. Assuming that the hidden layer 1020 includes a first hidden layer, a second hidden layer, and a third hidden layer, an output of a hidden node included in the first hidden layer may be connected to hidden nodes belonging to the second hidden layer. An output of a hidden node belonging to the second hidden layer may be connected to hidden nodes belonging to the third hidden layer. In FIGS. 1 through 9, the neural network reducing apparatus reduces each hidden layer by mainly reducing a number of edges between hidden nodes in the hidden layers.

For example, a training apparatus, a recognition apparatus, and the neural network reducing apparatus input outputs of previous hidden nodes included in a previous hidden layer into each hidden layer through edges having connection weights, and generate outputs of hidden nodes included in a hidden layer based on values obtained by applying the connection weights to the outputs of the previous hidden nodes and activation functions. To fire an output to a next hidden node, a result of the activation functions needs to exceed a threshold of a current hidden node. In this example, a node maintains a deactivated state without firing a signal to a next node until a predetermined threshold strength of activation is reached through input vectors.

The training apparatus and the neural network reducing apparatus train the neural network 1000 through supervised learning. The training apparatus and the neural network reducing apparatus may be implemented as software modules, hardware modules, or a combination thereof. Supervised learning refers to a method of inputting a training input of training data and a corresponding training output into the neural network 1000, and updating connection weights of edges so that output data corresponding to the training output of the training data may be output. Although FIG. 10 illustrates the structure of the neural network as a structure of nodes, examples are not limited to the illustrated structure. Various data structures may be used to store the neural network in a memory storage.

The training apparatus and the neural network reducing apparatus determine parameters of the nodes through a gradient descent scheme which is based on a loss to be back-propagated to the neural network and output values of the nodes included in the neural network. For example, the training apparatus and the neural network reducing apparatus update the connection weights among the nodes through loss back-propagation learning. Loss back-propagation learning refers to a method of estimating a loss with respect to provided training data through forward computation, and updating connection weights to reduce the loss while propagating the estimated loss in a backward direction from the output layer 1030 toward the hidden layer 1020 and the input layer 1010. Processing of the neural network 1000 is performed in an order of the input layer 1010, the hidden layer 1020, and the output layer 1030. However, in the loss back-propagation learning, the connection weights are updated in an order of the output layer 1030, the hidden layer 1020, and the input layer 1010. To process the neural network as desired, one or more processors use a buffer memory configured to store layers or a series of computed data.

The training apparatus and the neural network reducing apparatus define an objective function to be used to measure optimalities of currently set connection weights, continuously change the connection weights based on a result of the objective function, and iteratively perform training. For example, the objective function is a loss function to be used by the neural network 1000 to calculate a loss between an actual output value and a value expected to be output with respect to a training input of training data. The training apparatus and the neural network reducing apparatus update the connection weights to reduce a value of the loss function.

Figure 11:
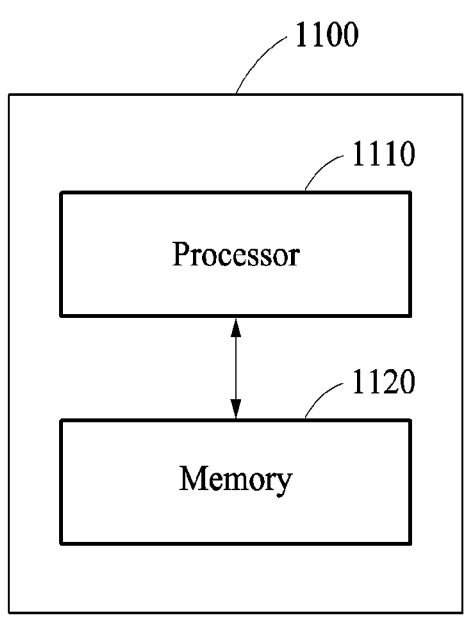
FIG. 11 is a block diagram illustrating a configuration of a neural network reducing apparatus, according to an embodiment.

FIG. 11 is a block diagram illustrating a configuration of a neural network reducing apparatus 1100, according to an embodiment.

Referring to FIG. 11, the neural network reducing apparatus 1100 includes a processor 1110 and a memory 1120.

Although a single processor is shown, the processor 1110 may include multiple processors or cores. The processor 1110 operates inside a computing device having multi-core processors, for example. In another example, each of the multi-core processors is a general purpose graphic processing unit (GPGPU). In another example, each of the multi-core processors is a field-programmable gate array (FPGA), or a customizable multi-core processor. In another example, the processor 1110 exchanges data through an internal bus, such as a peripheral component interconnect express (PCI-E) bus. In another example, the processor 1110 is a single-core processor.

When at least one instruction is executed by the processor 1110, the processor 1110 adds a reduced layer, which is reduced from at least one layer included in a neural network to the neural network, computes a layer loss and a result loss with respect to the reduced layer based on the at least one layer and the reduced layer, and determines a parameter of the reduced layer based on the layer loss and the result loss.

The memory 1120 stores at least one instruction executable by the processor 1110. Further, the memory 1120 stores at least one of a neural network, a reduced neural network, or training data.

The operations described with reference to FIGS. 1 through 10 may be performed by the processor 1110 of the neural network reducing apparatus 1100. However, embodiments are not limited to this example, and the operations may be performed by anther device.

The processor 1110 and the memory 1120 in FIG. 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reduced neural network generation method, the method comprising:
   adding a first reduced layer, which is reduced from a first layer in a neural network, to the neural network;
   dependent on the adding,
      computing a first layer loss, with respect to the first reduced layer, dependent on both results of the first layer and results of the first reduced layer, and
      computing a first result loss, with respect to the first reduced layer, dependent on the results of first reduced layer; and
   determining a parameter for the first reduced layer based on consideration of both the first layer loss and the first result loss.

2. The method of claim 1, wherein the determining of the parameter for the first reduced layer comprises:
   computing a network loss based on the first layer loss and the first result loss; and
   determining the parameter for the first reduced layer to reduce the network loss.

3. The method of claim 2, further comprising:
   generating a reduced neural network of the neural network by removing the first layer from the neural network with the added first reduced layer, in response to the network loss being less than a threshold loss.

4. The method of claim 2, wherein the computing of the network loss comprises:
   determining a layer weight to be applied to the first layer loss to be a value greater than a result weight to be applied to the first result loss, in response to the network loss being greater than or equal to an initial loss; and
   computing the network loss based on the layer weight, the first layer loss, the result weight, and the first result loss.

5. The method of claim 2, further comprising:
   determining a layer weight to be applied to the first layer loss to be a value greater than a result weight to be applied to the first result loss, in response to the network loss being less than an initial loss; and
   computing the network loss based on the first layer weight, the first layer loss, the first result weight, and the first result loss.

6. The method of claim 1,
   wherein the computing of the first layer loss is based on an output of the first layer and an output of the first reduced layer, and
   wherein the computing of the first result loss is based on the output of the first reduced layer for training data and a mapped training output of the training data.

7. The method of claim 6, wherein
   the computing of the first layer loss comprises computing a similarity between the output of the first layer and the output of the first reduced layer, and
   the computing of the first result loss comprises computing a similarity between the output of the first reduced layer and the mapped training output.

8. The method of claim 1, comprising training of the reduced layer, including the determining of the parameter for the reduced layer, until a calculated network loss is less than a threshold loss for a corresponding first reduced layer that has a correspondingly determined layer parameter; and the method further comprises:
adding a second reduced layer, which is reduced from a second layer in the neural network, to an interim neural network that includes one or more layers of the neural network, without the first layer, and includes the corresponding first reduced layer;
dependent on the adding of the second reduced layer, computing a result loss based on the corresponding first reduced layer,
computing a second layer loss dependent on results of the second layer and results of the second reduced layer, and
computing a second result loss dependent on the results of the second reduced layer; and
determining a parameter for the second reduced layer based on consideration of the computed result loss, the computed second layer loss, and the computed second result loss.

9. The method of claim 1, comprising generating an interim neural network, including the adding of the first reduced layer,
wherein the generating of the interim neural network comprises:
generating plural reduced layers respectively corresponding to plural layers in the neural network; and
generating the interim neural network by combining the plural reduced layers and the plural layers of the neural network, including respectively connecting the plural reduced layers based on a connection order of the plural layers in the neural network, and, for each connection order, compute a corresponding layer loss based on a result of a corresponding layer of the plural layers and a result of a corresponding layer of the plural reduced layers for training the plural reduced layers to be combined as a reduced neural network of the neural network.

10. The method of claim 9, wherein the computing of the first layer loss and the first result loss comprises:
using the interim neural network, computing plural layer losses for a same epoch based respectively on an output of each of the plural layers and an output of each of the plural reduced layers; and
using the interim neural network, computing plural result losses based respectively on the output of each of the plural reduced layers and a mapped training output of training data for each corresponding depth of the plural reduced layers.

11. The method of claim 10, wherein the determining of the parameter for the first reduced layer comprises:
computing a network loss based on a weighted sum of the plural layer losses and a weighted sum of the plural result losses; and
training the plural reduced layers to reduce the network loss.

12. The method of claim 9, further comprising generating the reduced neural network using the trained reduced layers of the interim neural network without the plural layers of the neural network.

13. The method of claim 1, wherein the adding of the first reduced layer comprises:
generating the first reduced layer based on a reducing of a number of parameters of the first layer; and
connecting the first reduced layer to another layer in the neural network.

14. The method of claim 1, wherein the adding of the first reduced layer comprises generating the first reduced layer based on a reducing of plural layers in the neural network to a single layer.

15. The method of claim 1, wherein the adding of the first reduced layer comprises generating the first reduced layer based on a reducing of a layer of the neural network connected adjacent to an input layer in the neural network.

16. The method of claim 1, wherein the adding of the first reduced layer comprises generating the first reduced layer based on a reducing of a layer of the neural network connected adjacent to an output layer in the neural network.

17. The method of claim 1, comprising training the first reduced layer by repeating the determining of the parameter for the reduced first reduced layer,
each repeating of the determining of the parameter for the first reduced layer being dependent on respective computations of a network loss, with the repeating of the determining of the parameter being performed until the network loss is less than a threshold loss, and
wherein the respective computations of the network loss are based on, corresponding to each result of the repeated determining of the parameter for the first reduced layer, respective re-computations of the first layer loss and re-computations of the first result loss.

18. The method of claim 1, comprising training the first reduced layer, including the determining of the parameter for the first reduced layer, by determining parameters of nodes for the first reduced layer using gradient descent loss propagation.

19. The method of claim 1, further comprising:
obtaining the neural network comprising plural layers each including nodes, with respective weighted connections connecting nodes of each adjacent layer of the plural layers,
wherein the adding of the first reduced layer includes generating the first reduced layer to have a reduced total number of nodes, reduced from a total number of nodes in the first layer, and/or a reduced total number of weighted connections, reduced from a total number of weighted connections in the first layer.

20. A non-transitory computer-readable medium storing instructions that, when executed by a processor, cause the processor to perform the method of claim 1.

21. The method of claim 1,
wherein the first layer loss is dependent on similarities between the results of the first layer and the results of the first reduced layer, and
wherein the first result loss is dependent on similarities between the results of the first reduced layer and corresponding mapped training output of training data.

22. The method of claim 21,
wherein the first layer loss is a Euclidean distance-based loss with respect to the results of the first layer and results of the first reduced layer, and
wherein the computing of the first result loss includes computing a cross entropy loss between the results of the first reduced layer and the corresponding mapped training output of the training data.

23. An apparatus, the apparatus comprising:
one or more processors; and
a memory storing instructions that when executed by the one or more processors configure the one or more processors to:
add a first reduced layer, which is reduced from a first layer in a neural network, to the neural network;
dependent on the adding, compute a first layer loss for training data, with respect to the first reduced layer, dependent on similarities between results of the first layer and results of the first reduced layer, and compute a first result loss for the training data, with respect to the first reduced layer, dependent on similarities between the results of first reduced layer and corresponding mapped training output of the training data; and generate a reduced neural network based on a training of the first reduced layer that includes a determination of a parameter for the first reduced layer based on consideration of both the first layer loss and the first result loss.

* * * * *